(12) United States Patent
Schmidt et al.

(10) Patent No.: US 9,260,106 B2
(45) Date of Patent: Feb. 16, 2016

(54) METHOD AND DEVICE FOR CONTROLLING AN INTERNAL COMBUSTION ENGINE

(71) Applicant: Robert Bosch GmbH, Stuttgart (DE)

(72) Inventors: Matthias Schmidt, Stuttgart (DE); Axel Reuter, Vaihingen an der Enz (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/402,649

(22) PCT Filed: Apr. 4, 2013

(86) PCT No.: PCT/EP2013/057074
§ 371 (c)(1),
(2) Date: Nov. 20, 2014

(87) PCT Pub. No.: WO2013/174564
PCT Pub. Date: Nov. 28, 2013

(65) Prior Publication Data
US 2015/0142236 A1 May 21, 2015

(30) Foreign Application Priority Data
May 21, 2012 (DE) .......... 10 2012 208 461

(51) Int. Cl.
*B60L 9/00* (2006.01)
*B60W 20/00* (2006.01)
*B60W 10/06* (2006.01)
*B60W 10/08* (2006.01)
*B60K 6/20* (2007.10)
*B60K 6/485* (2007.10)

(52) U.S. Cl.
CPC ............. *B60W 20/106* (2013.01); *B60W 10/06* (2013.01); *B60W 10/08* (2013.01); *B60K 6/20* (2013.01); *B60K 6/485* (2013.01); *B60W 2540/10* (2013.01); *B60W 2540/12* (2013.01); *B60W 2710/0666* (2013.01); *B60W 2710/083* (2013.01); *B60W 2710/086* (2013.01); *Y02T 10/6226* (2013.01); *Y02T 10/6286* (2013.01)

(58) Field of Classification Search
CPC ......... F02B 39/10; F02D 23/00; F02D 29/06; F02D 41/0007; F02D 41/0035; Y02T 10/123; Y02T 10/144; Y02T 10/146; Y02T 10/48; Y02T 10/56; Y02T 10/6221; Y02T 10/6269; Y02T 10/6286; Y02T 10/642
USPC .................. 701/22, 83, 84, 70, 490; 903/930; 180/65.1–65.8; 340/995.1, 995.19
See application file for complete search history.

(56) References Cited

U.S. PATENT DOCUMENTS

| 8,589,009 B2 * | 11/2013 | Hirsch | .................... B60L 11/12 |
| | | | 701/22 |
| 2003/0173124 A1 * | 9/2003 | Okada | .................... B60K 25/02 |
| | | | 180/65.225 |

(Continued)

FOREIGN PATENT DOCUMENTS

DE 103 46 213 4/2005
DE 102005047940 4/2007

(Continued)

OTHER PUBLICATIONS

International Search Report for PCT/EP2013/057074, dated Jun. 26, 2013.

*Primary Examiner* — Muhammad Shafi
(74) *Attorney, Agent, or Firm* — Kenyon & Kenyon LLP

(57) ABSTRACT

A method for operating a drive train which has an electric motor for producing a mechanical target torque corresponding to an electric desired power level includes: specifying, as a function of a state of charge of a power battery, the electric desired power level, the electric desired power level being independent of the state of charge of the power battery when the state of charge of the power battery is in a plateau region.

9 Claims, 6 Drawing Sheets

(56) References Cited

U.S. PATENT DOCUMENTS

2009/0198396 A1* 8/2009 Rodriguez ............ B60W 10/08
                                                    701/22
2010/0300405 A1* 12/2010 Uhrich .................... F02B 33/40
                                                    123/435
2012/0316719 A1* 12/2012 Hirsch .................... B60L 11/12
                                                    701/22

FOREIGN PATENT DOCUMENTS

| DE | 10 2006 036443 | | 2/2008 |
| DE | 10 2007 024471 | | 11/2008 |
| DE | 10 2008 050737 | | 4/2010 |
| DE | 10 2010 005837 | | 7/2011 |
| DE | 102010005837 | * | 7/2011 |
| EP | 1 468 865 | | 10/2004 |

* cited by examiner

METHOD AND DEVICE FOR CONTROLLING AN INTERNAL COMBUSTION ENGINE

BACKGROUND OF THE INVENTION

1. Field of the Invention

The present invention relates to a method, a computer program and a device for controlling and/or regulating an electric drive in hybrid vehicles, in particular for entry-level hybridizations having voltages below 60V.

2. Description of the Related Art

In the context of public discussions relating to CO2, and of constantly increasing fuel prices, the importance of systems for reducing fuel consumption and CO2 emissions is increasing. A hybridization of the drive train will therefore increasingly gain in importance.

A goal of hybrid vehicles is the recuperation of the kinetic energy released during braking, or of the potential energy released when traveling downhill. This energy can be used for example to supply the vehicle electrical network, which has a significant influence on fuel consumption.

If the electric motor also enables motoric operation, through an inverter, then the drive moment of the internal combustion engine can be increased (boosted) through an electrical torque, in order for example to increase drivability. If, in addition, e.g. through recuperation, more energy is recuperated than is required for the supplying of the vehicle electrical network and the boost function, there is in addition the possibility of reducing, in a targeted manner, the drive torque of the internal combustion engine, and compensating this through an electrical torque.

Through this shift of load point, a further reduction of fuel consumption can be achieved. Thus, for the hybridization of the drive train a suitable electric motor and a suitable energy storage device, such as for example a lithium-ion battery as power battery, are required, as is a suitable regulation strategy.

In hybrid vehicles, the electric drive can be used either in motoric fashion to support the internal combustion engine or as a generator, e.g. for the recuperation of braking energy. However, if the power battery has a low state of charge, or in general a poor state, e.g. due to temperature or aging, it may be necessary to use generator operation outside of braking phases as well. In this case, the electric drive is not driven from the kinetic or potential energy of the vehicle, but rather must be driven by the internal combustion engine using additional fuel to produce current to charge the power battery or to supply the vehicle electrical network. In this case, generator operation causes an increase in fuel consumption.

For the regulation of the operating modes of the electric drive, i.e. both motoric power and generator power modes, various energy management strategies are possible. The goal of these strategies can be to enforce a target state of charge. This has the result that after a recuperation phase, and thus at a state of charge greater than the target state of charge, a boost phase is introduced until the target state of charge has been reached. However, if the driver requests electrical support over a longer period of time, it is also sought, after this boost phase, to use generator operation of the electric drive to restore the target state of charge as quickly as possible, in this case using fuel to drive the electric drive in generator mode. The goal of restoring the target state of charge as quickly as possible causes cyclization and thus aging of the power battery.

From published German patent application document DE 103 46 213 A1, a method is known for regulating the state of charge of an energy storage device in a vehicle having hybrid drive, in which the state of charge of the energy storage device is regulated by a charge regulating device as a function of the travel speed of the vehicle.

BRIEF SUMMARY OF THE INVENTION

The present invention has in contrast the advantage that the cyclization, and thus the aging, of the power battery is reduced.

In a first aspect, the present invention relates to a method for operating a drive train that includes an electric motor for producing a mechanical target torque corresponding to an electric desired power level, in which the electric desired power is specified as a function of a state of charge of a power battery, the electric desired power being independent of the state of charge of the power battery when the state of charge of the power battery is in a plateau region.

That is, in the drive train, which includes all drive aggregates, there is at least also the electric motor. An electric desired power level (generator-based or motoric) is specified that this electric motor is to produce. According to the rotational speed of the electric motor, this electric desired power level corresponds to a torque, which is the mechanical target torque. The electric motor attempts to set this mechanical target torque, i.e. to set the torque that it outputs so that it corresponds as precisely as possible (for example apart from inherent inertia) to the mechanical target torque.

It is provided that the curve of the electric desired power level as a function of the state of charge of the power battery has a plateau region in which the electric desired power level as a function of the state of charge does not change. According to the present invention, this plateau region includes a substantial portion (at least 10%, preferably >30%) of the possible state of charge, which extends from 0% to 100%.

In a further aspect of the present invention, it can be provided that the electric motor is operated neither in generator mode nor in motoric mode if the state of charge of the power battery is in the plateau region and a target coupling torque is small enough that it can be provided by an internal combustion engine of the drive train.

The target coupling torque, i.e. the torque that is to be transmitted in the drive train to the drive wheels via the coupling, is provided by the electric motor and by the internal combustion engine. If the internal combustion engine alone is capable of producing enough torque to reach this target coupling torque, then the electric motor is controlled in such a way that (apart from frictional losses) it produces no torque when the state of charge is in the plateau region. In this way, the cyclization of the power battery is particularly effectively prevented.

This can for example be the case when the target coupling torque changes sufficiently slowly, so that the inertia, in particular of the ventilation system of the internal combustion engine, does not prevent the torque generated by the internal combustion engine from providing the target coupling torque at the coupling, to a good approximation.

In a further aspect of the present invention, it can be provided that the mechanical target torque is selected such that the power battery is charged when its state of charge takes on values smaller than a first threshold value. When the electric motor sets this mechanical target torque, the electric power generated by it is then greater than the vehicle electrical network power, i.e. greater than the electric power used by all consumers in the vehicle network with the exception of the power battery. This has the advantage that through the selection of the first threshold value a lower limit of the state of charge of the power battery can be specified, which in normal operation is not fallen below. This increases the lifespan of the power battery.

In a further aspect of the present invention, it can be provided that the mechanical target torque is determined from a non-limited mechanical target torque, in that the non-limited mechanical target torque is limited, in a limiting step, to values greater than or equal to a lower mechanical limit and/or to values less than or equal to an upper mechanical limit. Here, the upper mechanical limit and the lower mechanical limit are torques. The upper mechanical limit corresponds to the maximum permissible torque of the electric motor in motoric operation. The lower mechanical limit is, correspondingly, the minimum permissible torque of the electric motor, as the greatest (with respect to magnitude) generator-based torque of the electric motor (with negative sign). If the non-limited mechanical torque is greater than the upper mechanical limit, or less than the lower mechanical limit, then the mechanical torque is set equal to the upper, or lower, mechanical limit. Otherwise, the mechanical target torque is set equal to the non-limited mechanical target torque. In this way, the electric motor can be prevented particularly effectively from requesting a mechanical target torque that this motor cannot produce.

In a further aspect of the present invention, it can be provided that the lower mechanical limit and/or upper mechanical limit are chosen as a function of the state of charge of the power battery. In this way, the power battery can be prevented particularly easily from being deeply discharged or overcharged.

In a further aspect of the present invention, it can be provided that the non-limited mechanical torque is determined as the difference between the target coupling torque and an actual torque of the internal combustion engine of the drive train. In this way, it is ensured particularly simply that, in a stationary state (i.e. when the target specifications in the drive train change so slowly that the drive aggregates supply torques that correspond to their target values), the sum of the torques of the internal combustion engine and of the electric motor result in the target coupling torque.

In a further aspect of the present invention, it can be provided that the one internal combustion engine target torque is determined as the difference of the target coupling torque and a mechanical desired torque. Here, the mechanical target torque is the torque that (at a given rotational speed of the electric motor) corresponds directly to the electric desired power level. The internal combustion engine target torque is the target torque that is specified to the controlling and/or regulation of the internal combustion engine. The controlling and/or regulation of the internal combustion engine sets the operating parameters of the internal combustion engine in such a way that the internal combustion engine actual torque tracks the internal combustion engine target torque as well as possible. Through the provided difference formation, it is ensured that the internal combustion engine target torque is to a large extent set such that the finally resulting mechanical target torque corresponds to the mechanical desired torque as well as possible (that is, except for limitations of the components of the drive train).

In a further aspect of the present invention, it can be provided that the mechanical desired torque is determined as a function of the state of charge of the power battery. In this way, the charge and/or discharge processes of the power battery can be monitored in a particularly simple manner.

In a further aspect of the present invention, it can be provided that the mechanical desired torque is independent of the state of charge of the power battery, when the state of charge of the power battery is in the plateau region. In this way, a cyclization of the power battery can be minimized in a particularly simple manner.

In a further aspect of the present invention, it can be provided that the mechanical desired torque is selected to be equal to zero when the state of charge of the power battery is in the plateau region. In this way, a cyclization of the power battery can be suppressed in a particularly simple manner.

In a further aspect of the present invention, it can be provided that the mechanical desired torque is selected such that the electric motor is operated in generator mode when the state of charge of the power battery is less than a lower limit of the plateau region. In this way, a deep discharging of the power battery can be effectively suppressed in a particularly simple manner.

In a further aspect of the present invention, it can be provided that the mechanical desired torque is selected such that the electric motor is operated in generator mode when the state of charge of the power battery is greater than an upper limit of the plateau region. In this way, an overcharging of the power battery can be effectively suppressed in a particularly simple manner.

It is particularly advantageous if a computer program is provided that is programmed to carry out all steps of the method according to the present invention. Such a computer program is particularly advantageously stored on an electrical storage medium for a control and/or regulating device of the internal combustion engine. Thus, this control and/or regulating device is advantageously programmed such that it can execute all steps of the method according to the present invention.

DETAILED DESCRIPTION OF THE INVENTION

Figure 1:
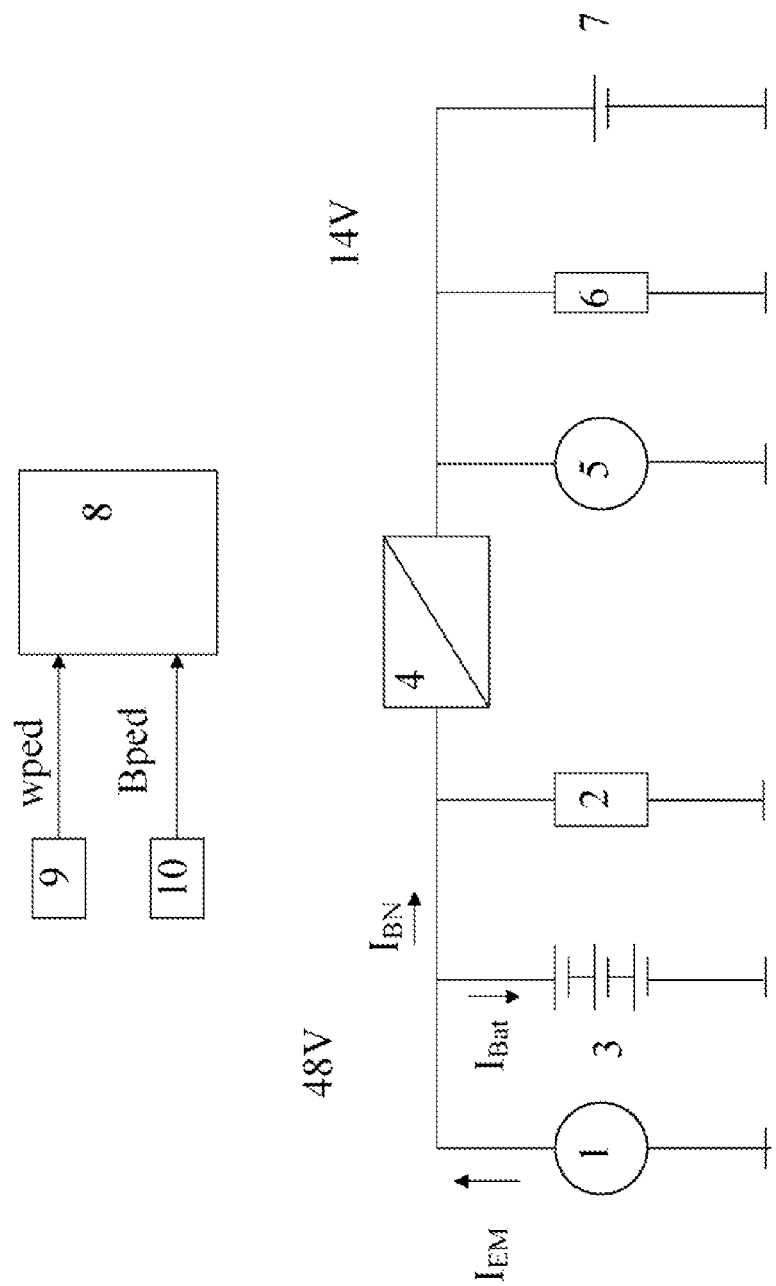
FIG. 1 schematically shows a two-voltage vehicle electrical network.

FIG. 1 schematically shows a two-voltage vehicle network of a hybridized drive train having a 14-volt low-voltage vehicle electrical network and a 48-volt high-voltage vehicle electrical network. In the high-voltage part of the vehicle electrical network, there are present an electric motor 1, for example a starter-generator 1, further electrical consumers 2 (shown only schematically), and a power battery 3. In the low-voltage part of the vehicle electrical network there are present a starter 5, which can be used for example for conventional starts, further electric consumers 6 (indicated only schematically), and a conventional battery 7. The high-voltage parts and low-voltage part of the vehicle electrical network are coupled by a DC-DC converter 4. The controlling and/or regulation of the components of the drive train takes place for example via control and/or regulating device 8

(hereinafter called "control device"), on which it is also possible to carry out the method according to the present invention through a computer program stored in an electric storage medium.

From electric motor 1 there flows a current flow $I_{EM}$ of electric motor 1. This current flow $I_{EM}$ of electric motor 1 is divided into a battery current $I_{Bat}$ that charges power battery 3 and a vehicle electrical network current $I_{BN}$ which provides the remaining portion of current $I_{EM}$ of the electric motor, which is not supplied to power battery 3, to the remaining components of the rest of the vehicle electrical network. A battery voltage $U_{Bat}$ is dropped across power battery 3.

An accelerator pedal 9, or brake pedal 10, each supply their degrees of actuation to control device 8 via a respective sensor mechanism. Accelerator pedal 9 communicates its degree of actuation wped to control device 8, and brake pedal 10 communicates its degree of actuation Bped to control device 8. In control device 8 there can be present in particular an evaluation logic system that decides how to proceed in the case in which the degree of actuation of both the accelerator pedal and the brake pedal is not equal to zero. For example, it is possible that in such a case the degree of actuation of the accelerator pedal wped is set internally to 0, so that the degree of actuation of the brake pedal is given priority. When reference is made in the following to the degree of actuation of the accelerator pedal or of the brake pedal, this is always to be understood in the sense of degrees of actuation that have been evaluated by such an evaluation logic system, so that in particular it is always the case that at least one of the two quantities wped, Bped is equal to zero.

For example, via a suitable sensor mechanism, or for example via suitable methods, the control device determines the state of charge SOC of power battery 3.

Figure 2:
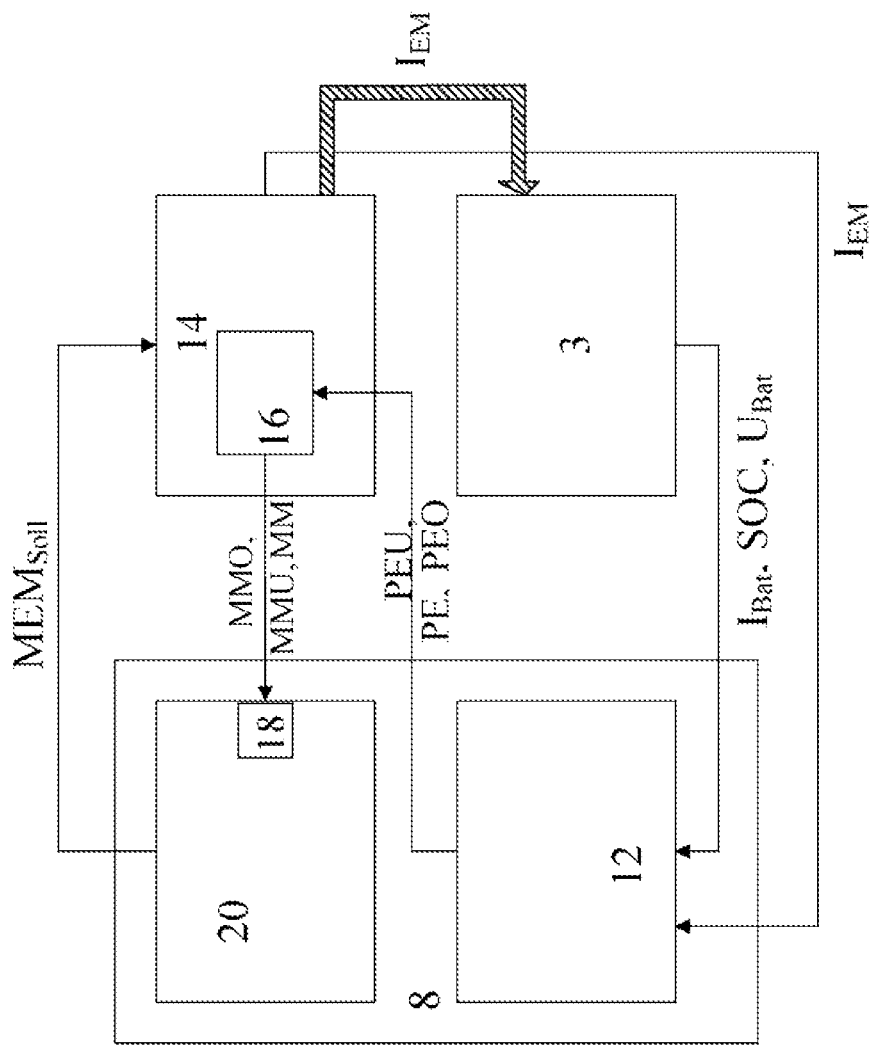
FIG. 2 schematically shows the design of information flows for controlling the electric motor.

FIG. 2 schematically shows the design of control components of the drive train. Shown at center is electric motor management unit 14, which includes a conversion block 16. Conversion block 16 receives electric desired power level PE and an upper electric limit PEO, and/or a lower electric limit PEU, which both also correspond to power levels.

In addition, conversion block 16 receives a rotational speed of electric motor 1, determined for example by a sensor. This sensor can for example also acquire the rotational speed of a crankshaft from which the rotational speed of electric motor 1 is then determined.

From the electric desired power level PE, conversion block 16 determines mechanical desired torque MM. Analogously, from upper electric limit PEO and/or lower electric limit PEU, upper mechanical limit MMO, or the lower mechanical limit MMU, are determined. This determination takes place for example using characteristic fields that are obtained for example in trials or through theoretical considerations, in which the relation is shown between the generated torque, current flow, and rotational speed of electric motor 1. Under the assumption of a constant voltage of the vehicle electrical network (in the exemplary embodiment a nominal voltage of 48V), a corresponding current flow is then determined from an electric power level, and from this current flow the associated torque is determined.

Mechanical desired torque MM, as well as upper mechanical limit MMO and/or lower mechanical limit MMU, are communicated to a belt drive management system 18. This belt drive management system 18 is contained for example in a power train management system 20. Belt drive management system 18 converts mechanical desired torque MM, upper mechanical limit MMO, and/or lower mechanical limit MMU to the rotational speed of the crankshaft as needed, so that all torques have a common reference base.

Figure 3:
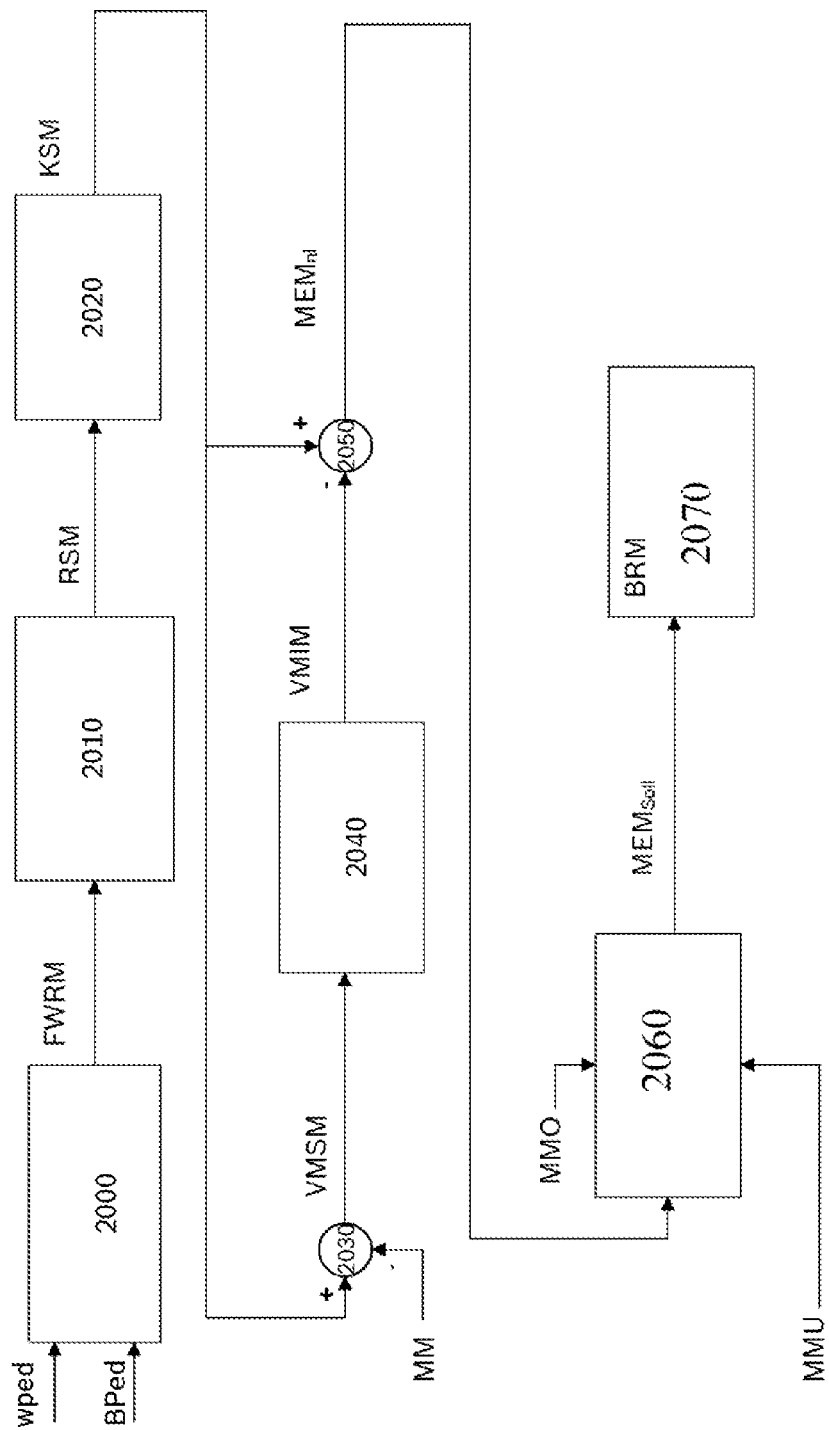
FIG. 3 schematically shows the sequence of the method according to the present invention.

On the basis of the mechanical desired torque MM, upper mechanical limit MMO, and/or lower mechanical limit MMU, power train management system 18 determines mechanical target torque $MEM_{Soll}$, for example on the basis of the method shown in FIG. 3. This mechanical target torque $MEM_{Soll}$ is provided to electric motor management system 14, which controls electric motor 1 in such a way that it produces a torque that corresponds to mechanical target torque $MEM_{Soll}$. As a result, an electric motor 1 produces current flow $I_{EM}$ of the electric motor, which at least in part is supplied to or taken from power battery 3, as indicated by the hatched arrow.

Power battery 3 includes a control logic system that determines momentary battery current $I_{Bat}$, battery voltage $U_{Bat}$, and state of charge SOC, and communicates them to an energy management system 12. Optionally, it can be provided that electric motor management system 14 communicates to energy management system 12 the value (for example determined as an estimated value) of current flow $I_{EM}$ of electric motor 1. Energy management system 12 determines electric desired power level PE as well as upper electric limit PEO and/or lower electric limit PEU, and communicates these to conversion block 16 of electric motor management system 14.

FIG. 3 shows an example of the sequence of the method according to the present invention in power train management system 20. In a step 2000, the degree of actuation of accelerator pedal wPed and the degree of actuation of brake pedal BPed are determined, and from these the driver's desired wheel torque FWRM is determined. This is supplied to a step 2010 in which torque-controlling interventions such as interventions in the driving dynamic (e.g. through ESP) and/or interventions in the transmission (e.g. when changing gears) are taken into account in order in this way to determine the wheel target torque RSM that is to be set at the drive wheel, which is supplied to a step 2020. In step 2020, from wheel target torque 2020 target coupling torque KSM is determined.

In step 2030, internal combustion engine target torque VMSM is determined as target coupling torque KSM minus mechanical desired torque MM. In a step 2040, internal combustion engine target torque VMSM is determined by control device 8 through corresponding controlling of the variables of the internal combustion engine; that is, the internal combustion engine sets a torque that corresponds to internal combustion engine target torque VMSM. For example via modeling, or also alternatively a sensor system, in step 2040 internal combustion engine actual torque VMIM is determined, i.e. the torque actually produced by the internal combustion engine. In step 2050, non-limited mechanical target torque $MEM_{nl}$ is determined as the difference of target coupling torque KSM and internal combustion engine actual torque VMIM. Non-limited mechanical target torque $MEM_{nl}$ is supplied to limiting step 2060, in which mechanical target torque $MEM_{Soll}$ is determined. If non-limited mechanical target torque $MEM_{nl}$ is greater than upper mechanical limit MMO, mechanical target torque $MEM_{Soll}$ is selected equal to upper mechanical limit MMO. If non-limited mechanical target torque $MEM_{nl}$ is smaller than lower mechanical limit MMU, mechanical target torque $MEM_{Soll}$ is selected equal to lower mechanical limit MMU. Otherwise, mechanical target torque $MEM_{Soll}$ is selected equal to non-limited mechanical target torque $MEM_{nl}$. In step 2070, mechanical target torque $MEM_{Soll}$ is communicated to electric motor management system 14.

FIG. 3 shows how electric desired power level PE, upper electric limit PEO, and lower electric limit PEU are determined in energy management system 12.

As a function of state of charge SOC of power battery 3, electric desired power level PE is determined by a desired power characteristic curve 120, or if necessary is specified by an optional desired power level characteristic curve in overrun operation 130. If overrun operation is present, this is communicated by the engine control unit for example by a flag "on/off." It can be provided that when this flag indicates that overrun operation is "on," the electric desired power level is determined according to the desired power level characteristic curve in overrun operation 130, and otherwise by desired power level characteristic curve 120.

As a function of state of charge SOC of power battery 3, upper electric limit PEO is determined through a boost characteristic curve 110. Analogously, lower electric limit PEU is determined through a braking characteristic curve 100.

In FIG. 3, state of charge SOC of power battery 3 is shown on the abscissa, and the electric power level is shown on the ordinate. A motoric electric power level is plotted downward, and generator power is plotted upward; i.e., positive desired power level PE and upper or lower limit PEO/PEU are plotted downward, with positive axis.

State of charge SOC is divided, by six threshold values (in increasing sequence: first threshold value 401, second threshold value 402, third threshold value 403, fourth threshold value 404, fifth threshold value 405, and sixth threshold value 406), into a total of seven regions: a first region B1 between state of charge SOC=0 and the first threshold value, a second region B2 between first threshold value 401 and second threshold value 402, a third region B3 between second threshold value 402 and third threshold value 403, a fourth region B4 between fourth threshold value 404 and fifth threshold value 405, a sixth region B6 between fifth threshold value 405 and sixth threshold value 406, and a seventh region at a state of charge greater than sixth threshold value 406.

Shown in broken lines is brake characteristic curve 100, which, at states of charge SOC smaller than threshold value 405, assumes an essentially constant value of positive generator-based power PGen. This positive generator power level PGen is selected such that this power level can be set by electric motor 1 and power battery 3 during a period of time that can be a few seconds, e.g. 5 seconds. Brake characteristic curve 100 then continuously falls off to zero, up to sixth threshold value 406, and in seventh region B7 is constantly=0, independent of state of charge SOC. It is also possible to select it to be constantly equal to vehicle electrical network power level 200 in seventh region B7.

Also shown is boost characteristic curve 110, which, at a state of charge SOC greater than second threshold value 402, assumes an essentially constant motoric power level PMot. This motoric power level PMot is selected such that this power level can be set by electric motor 1 and power battery 3 during a period of time of a few seconds, e.g. 5 seconds. The boost characteristic curve then falls off continuously to 0 and below in second region B2 as state of charge SOC decreases; thus, it returns to generator-based power. This generator-based power level PGen increases further as state of charge SOC of power battery 3 falls off further, and exceeds vehicle electrical network load 200 before reaching first threshold value 401. In first region B1, generator-based power level PGen, given by the boost characteristic curve, assumes an essentially constant value as a function of state of charge SOC.

Vehicle electrical network load 200 is determined in energy management system 12 for example as the product of vehicle network current $I_{BN}$ and the nominal voltage of the high-voltage partial vehicle network, which in the exemplary embodiment is 48V. Vehicle network current $I_{BN}$ can for example be determined as the difference between current flow $IE_M$ of electric motor 1 and battery current $I_{Bat}$.

For the entire state of charge region SOC of power battery 3, normal travel characteristic curve 120 (solid line) is situated above boost characteristic curve 110 (i.e., a higher generator-based power level PGen or a lower motoric power level PMot is indicated) and below brake characteristic curve 100 (i.e., a lower generator-based power level PGen or a higher motoric power level PMot is indicated). In first region B1 and second region B2, normal travel characteristic curve 120 assumes an essentially constant value for positive generator-based power PGen. This generator power PGen is for example selected such that power battery 3 can be charged continuously with this power level, i.e. for example until state of charge SOC exceeds second threshold value 402.

It then decreases, in third region B3 with increasing state of charge SOC, continuously to specifiable load threshold 200. In fourth region B4, generator power PGen and motoric power PMot are both=0, and in fifth region B5, or sixth region B6, motoric power level PMot, given by normal travel characteristic curve 120, continuously increases with increasing state of charge SOC of power battery 3.

Shown in broken lines is optional overrun characteristic curve 130, which in first region B1 and in second region B2 agrees with normal travel characteristic curve 120, and in third region B3, in fourth region B4, in fifth region B5, and in sixth region B6 indicates a generator power level PGen that is between normal travel characteristic curve 120 and brake characteristic curve 100. Positive generator power level PGen given by overrun characteristic curve 130 at first continuously decreases in third region B3 and in fourth region B4 with increasing state of charge SOC, until it reaches a value that is above specifiable load threshold 200. As state of charge SOC continues to increase, generator power PGen of overrun characteristic curve 130 is then essentially constant in fourth region B4 and in fifth region B5, and then continuously falls to zero in sixth region B6 as state of charge SOC increases. In seventh region B7, both generator power levels PGen and motoric power levels PMot of overrun characteristic curve 130=0.

In first region B1, which corresponds to a state of charge SOC of power battery 3 below permissible state of charge SOC of power battery 3, all characteristic curves are to be chosen such that they correspond to a generator power level PGen that is above the vehicle electrical network load. Thus, in this region boost characteristic curve 100 is to be selected such that it is certain to be above the maximum occurring vehicle electrical network load. Alternatively, generator power level PGen, corresponding to boost characteristic curve 110, can also be adapted dynamically in this region as a function of current vehicle electrical network load 200, e.g. as vehicle network load 200 plus a fixed power level, e.g. 500 W.

The representation of FIG. 4, in which negative values of the ordinate correspond to a motoric operation of electric motor 1, and in which positive values of the ordinate correspond to generator-based operation of electric motor 1, can easily be read as follows:

If the generator-based power level in FIG. 3 is greater than vehicle electrical network load 200, then power battery 3 is charged, and state of charge SOC correspondingly increases. Analogously, state of charge SOC decreases when generator power level PGen is less than vehicle network load 200.

The state of charge region between second threshold value 402 and third threshold value 403 represents a boost reserve 210; i.e., in this second region B2 of state of charge SOC, a boosting is available with maximum possible boost power (while this maximum possible boost power is no longer available at a lower state of charge SOC).

Analogously, the state of charge region between fourth threshold value 404 and fifth threshold value 405 represents a recuperation reserve 215; i.e., in this fifth region B5 recuperation is available with maximum possible generator-based power.

The state of charge region between first threshold value 401 and sixth threshold value 406 represents the usable state of charge region 220; i.e., in normal operation state of charge SOC will always move in this state of charge region 220 and will not leave it.

The state of charge region between third threshold value 403 and fourth threshold value 404 represents plateau region 230, in which desired electric power level PE, given by desired power level characteristic curve 230, as a function of state of charge SOC does not change. Third threshold value 403 thus represents the lower limit of plateau region 230, and fourth threshold value 404 represents the upper limit of plateau region 230.

Figure 4:
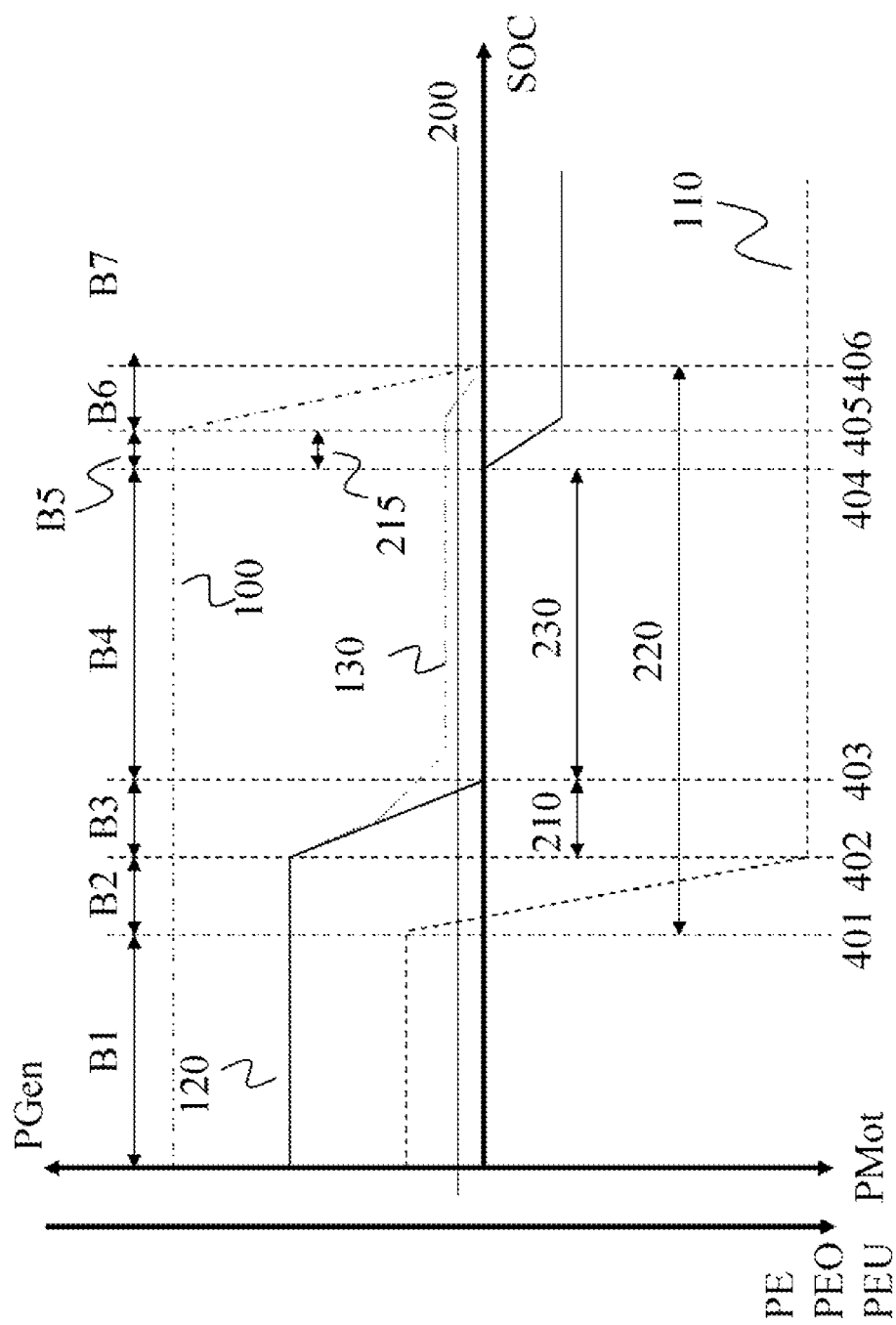
FIG. 4 schematically shows the functional relationships of desired electric power levels of the electric motor as a function of the state of charge of the power battery.

In the exemplary embodiment shown in FIG. 4, generator power level PGen given by desired power characteristic curve 120 and/or desired power characteristic curve in overrun operation 130, as a function of state of charge SOC, is constant in second region B2, and then bends downward at the transition to the third region, and falls to zero as state of charge SOC increases. The state of charge SOC at which this fall-off begins can also be situated already in second region B2 or in third region B3.

Figure 5:
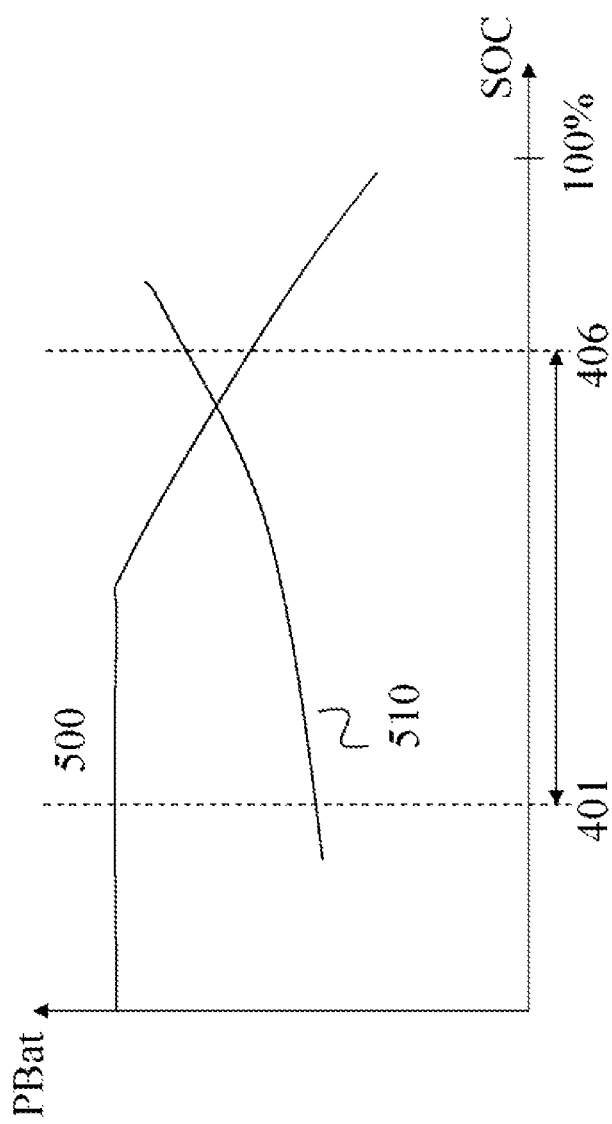
FIG. 5 schematically shows the power characteristic of a power battery.

To illustrate the selection of first threshold value 401 and sixth threshold value 406, reference is made to FIG. 5. Shown here is a battery power level $P_{Bat}$ of power battery 3 (given by the product of battery current $I_{Bat}$ and battery voltage $U_{Bat}$) over state of charge SOC of power battery 3. A charge characteristic curve 500 shows the characteristic relation between battery power $P_{Bat}$ and state of charge SOC during the charging of the battery, and a discharge characteristic curve 510 shows this relationship during discharging.

For smaller values of the state of charge, charge characteristic curve 500 assumes an approximately constant value of battery power $P_{Bat}$. At a characteristic value, for example a state of charge SOC of approximately 60%, battery power level $P_{Bat}$ begins to decrease as state of charge SOC increases. Battery power level $P_{Bat}$ characterized by discharge characteristic curve 510 increases over the entire region of state of charge SOC as state of charge SOC increases.

The lifespan of power battery 3 is characteristically a function of the selected width of usable state of charge region 220—the broader usable state of charge region 220 is selected to be, the shorter is the lifespan of power battery 3. By weighing the advantages of a broad usable state of charge region 220 against the disadvantages of a shortened lifespan, the width of usable state of charge region 220 can be determined, for example as 50% of the overall width of the region of possible states of charge SOC. In contrast, the position of state of charge region 220 has, in broad parts, no essential effect on the lifespan of power battery 3, so that first threshold value 401 and sixth threshold value 406 can be selected freely within broad limits, from the point of view of the lifespan of power battery 3, as long as their spacing from one another is equal to the selected width of usable state of charge region 220. For example, first threshold value 401 can be selected equal to 30%, and sixth threshold value 406 can be equal to 80%.

After first threshold value 401 has been fixed, second threshold value 402 can advantageously be selected such that the increase of boost characteristic curve 110 in the region between first threshold value 401 and second threshold value 402 is as steep as possible, but is nonetheless flat enough that it is not noticed by the driver. That is, if, during a boost process caused by the discharge of power battery 3, motoric power level PMot of electric motor 1 is reduced, this should not have any consequences that are perceptible by the driver. This can be determined for example in driving trials.

Likewise, after sixth threshold value 406 has been fixed, fifth threshold value 405 can be selected such that the increase in brake characteristic curve 100 in the region between fifth threshold value 405 and sixth threshold value 406 is as steep as possible, but is nonetheless flat enough that it is not noticed by the driver.

After second threshold value 402 has been fixed, third threshold value 403 can be selected such that boost reserve 210 has a characteristic selected magnitude. This magnitude of boost reserve 210 indicates the characteristic time duration during which boosting can take place with maximum motoric power PMot after power battery 3 has been charged in driving operation guided by desired power level characteristic curve 120. This characteristic time duration can for example be selected to be a few seconds, e.g. 5 seconds.

Likewise, after fifth threshold value 405 has been fixed, fourth threshold value 404 can be selected such that recuperation reserve 215 has a characteristic selected magnitude. This magnitude of recuperation reserve 215 indicates the characteristic time duration during which recuperation can take place with maximum generator power PGen, after power battery 3 has been discharged in driving operation guided by desired power level characteristic curve 120. This characteristic time duration can be selected for example as a few seconds, e.g. 5 seconds.

Figure 6:
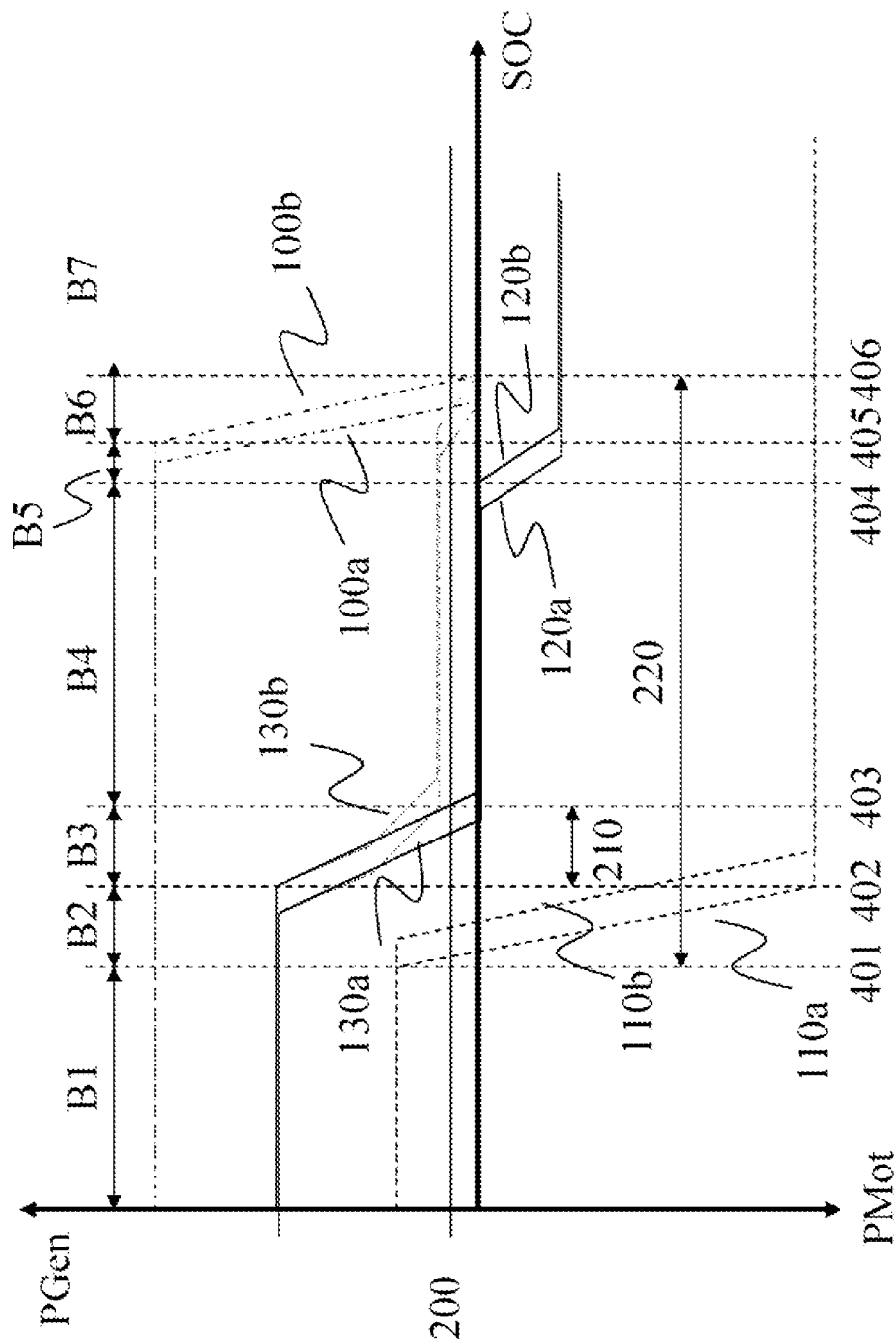
FIG. 6 schematically shows the functional relationships of desired electric power levels of the electric motor as a function of the state of charge of the power battery with a provided hysteresis.

FIG. 6 shows a further specific embodiment of the present invention in which the characteristic curves shown in FIG. 4, i.e. brake characteristic curve 100, boost characteristic curve 110, normal travel characteristic curve 120 and overrun characteristic curve 130 have each been replaced by a pair of characteristic curves that have been shifted in parallel toward one another along the abscissa, on which state of charge SOC of power battery 3 is shown. FIG. 4 shows a left brake characteristic curve 100a, a right brake characteristic curve 100b, a left boost characteristic curve 110a, a right boost characteristic curve 110b, a left normal travel characteristic curve 120a, a right normal travel characteristic curve 120b, a left overrun characteristic curve 130a, and a right overrun characteristic curve 130b.

In this exemplary embodiment, the method according to the present invention functions in a manner analogous to that presented above; in each case, one characteristic curve of each pair of left/right characteristic curves that is used is selected to carry out the method according to the present invention with a brake characteristic curve and/or boost characteristic curve and/or normal travel characteristic curve and/or overrun characteristic curve.

If the state of charge SOC of power battery 3 decreases, the left characteristic curve of a pair of characteristic curves is selected, and if state of charge SOC increases, then the right characteristic curve is selected. In this way, the characteristic curves are provided with hystereses, which ensures that a behavior results that is more reproducible, and that the generator-based or motoric torques defined by these characteristic curves, which change as a function of the state of charge, do not decrease for a short period of time and then shortly thereafter increase again.

What is claimed is:

1. A method for operating a drive train including an electric motor, comprising:
- selecting, by a controller including a processor, as a function of a state of charge of a power battery, the electric desired power level, wherein the electric desired power level is independent of the state of charge of the power battery when the state of charge of the power battery is in a plateau region;
- determining by the controller, a non-limited mechanical target torque as the difference between a target coupling torque and an actual torque of the internal combustion engine of the drive train; and
- producing by the electric motor, a mechanical target torque corresponding to the electric desired power level, wherein the mechanical target torque is determined from the non-limited mechanical target torque by limiting the non-limited mechanical target torque, in a step of limitation, to at least one of (i) a value greater than or equal to a lower mechanical limit, and (ii) a value less than or equal to an upper mechanical limit; wherein an internal combustion engine target torque is determined as the difference between the target coupling torque and a mechanical desired torque, wherein the mechanical desired torque is selected such that the electric motor is operated in generator mode when the state of charge of the power battery is smaller than a lower limit of the plateau region, and wherein the mechanical desired torque is selected such that the electric motor is operated in motor-driven mode when the state of charge of the power battery is greater than an upper limit of the plateau region.

2. The method as recited in claim 1, wherein the electric motor is operated neither in generator mode nor in motoric mode if the state of charge of the power battery is in the plateau region and the target coupling torque is able to be provided by the internal combustion engine of the drive train.

3. The method as recited in claim 2, wherein at least one of the lower mechanical limit and the upper mechanical limit is selected as a function of the state of charge of the power battery.

4. The method as recited in claim 1, wherein the mechanical target torque is selected such that the power battery is charged if the state of charge assumes values smaller than a first threshold value.

5. The method as recited in claim 1, wherein the mechanical desired torque is determined as a function of the state of charge of the power battery.

6. The method as recited in claim 5, wherein the mechanical desired torque is independent of the state of charge of the power battery when the state of charge of the power battery is in the plateau region.

7. The method as recited in claim 6, wherein the mechanical desired torque is selected to be equal to zero when the state of charge of the power battery is in the plateau region.

8. A non-transitory, computer-readable data storage medium storing a computer program having program codes which, when executed on a computer, performs a method for operating a drive train including an electric motor, the method comprising:
- selecting, by a controller including a processor, as a function of a state of charge of a power battery, the electric desired power level, wherein the electric desired power level is independent of the state of charge of the power battery when the state of charge of the power battery is in a plateau region;
- determining by the controller, a non-limited mechanical target torque as the difference between a target coupling torque and an actual torque of the internal combustion engine of the drive train; and
- producing by the electric motor, a mechanical target torque corresponding to the electric desired power level, wherein the mechanical target torque is determined from the non-limited mechanical target torque by limiting the non-limited mechanical target torque, in a step of limitation, to at least one of (i) a value greater than or equal to a lower mechanical limit, and (ii) a value less than or equal to an upper mechanical limit; wherein an internal combustion engine target torque is determined as the difference between the target coupling torque and a mechanical desired torque, wherein the mechanical desired torque is selected such that the electric motor is operated in generator mode when the state of charge of the power battery is smaller than a lower limit of the plateau region, and wherein the mechanical desired torque is selected such that the electric motor is operated in motor-driven mode when the state of charge of the power battery is greater than an upper limit of the plateau region.

9. A regulating device of a drive train, comprising:
a control unit including a processor configured to:
- select, as a function of a state of charge of a power battery, the electric desired power level, wherein the electric desired power level is independent of the state of charge of the power battery when the state of charge of the power battery is in a plateau region;
- determine a non-limited mechanical target torque as the difference between a target coupling torque and an actual torque of the internal combustion engine of the drive train; and
- produce a mechanical target torque corresponding to the electric desired power level, wherein the mechanical target torque is determined from the non-limited mechanical target torque by limiting the non-limited mechanical target torque, in a step of limitation, to at least one of (i) a value greater than or equal to a lower mechanical limit, and (ii) a value less than or equal to an upper mechanical limit; wherein an internal combustion engine target torque is determined as the difference between the target coupling torque and a mechanical desired torque, wherein the mechanical desired torque is selected such that the electric motor is operated in generator mode when the state of charge of the power battery is smaller than a lower limit of the plateau region, and wherein the mechanical desired torque is selected such that the electric motor is operated in motor-driven mode when the state of charge of the power battery is greater than an upper limit of the plateau region.

* * * * *